No. 749,348. PATENTED JAN. 12, 1904.
H. P. WILSON.
MACHINE FOR BENDING THE CROSS HEADS OF HAY BALE WIRES.
APPLICATION FILED DEC. 17, 1901.
NO MODEL. 6 SHEETS—SHEET 1.
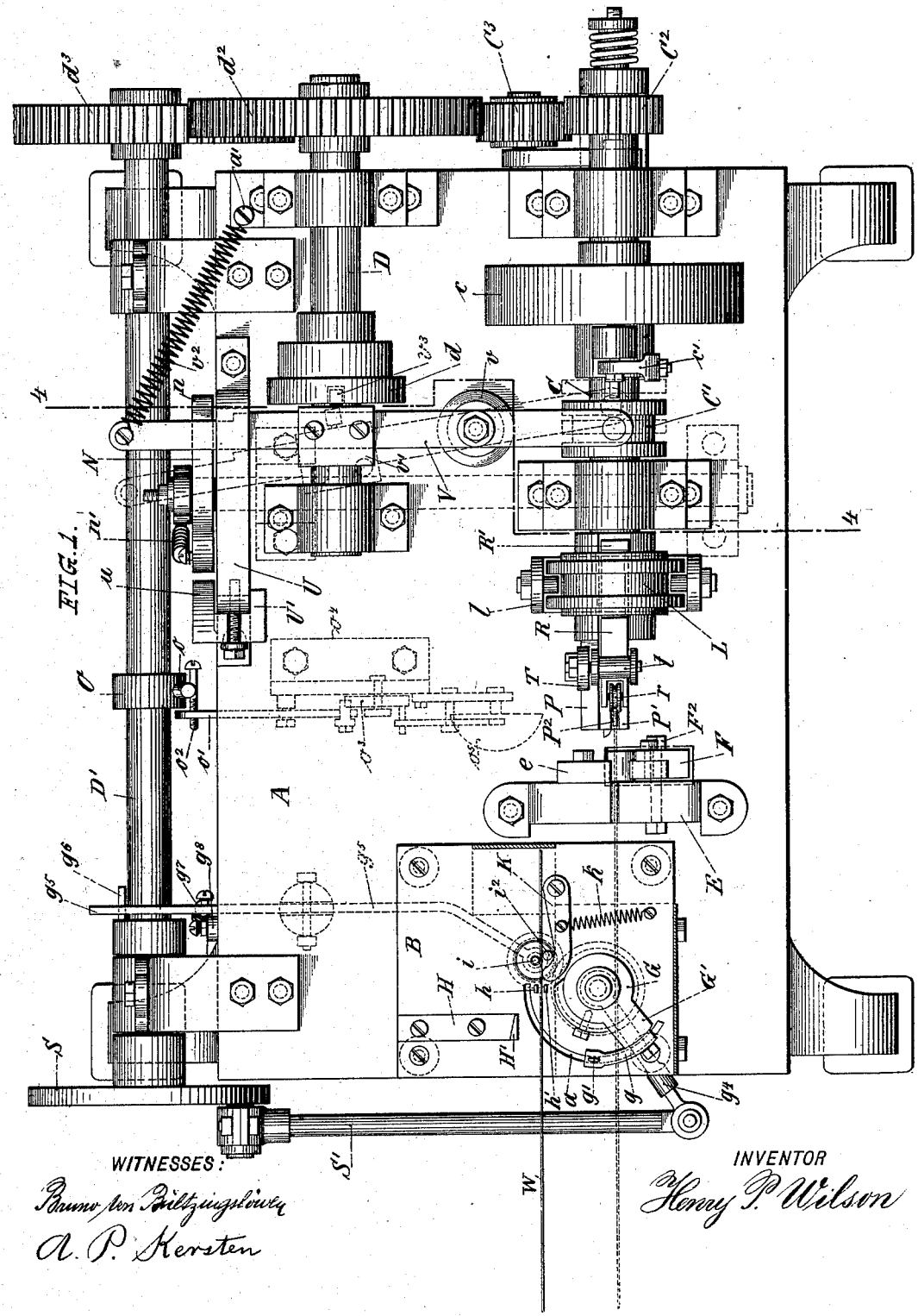
WITNESSES:
INVENTOR
Henry P. Wilson

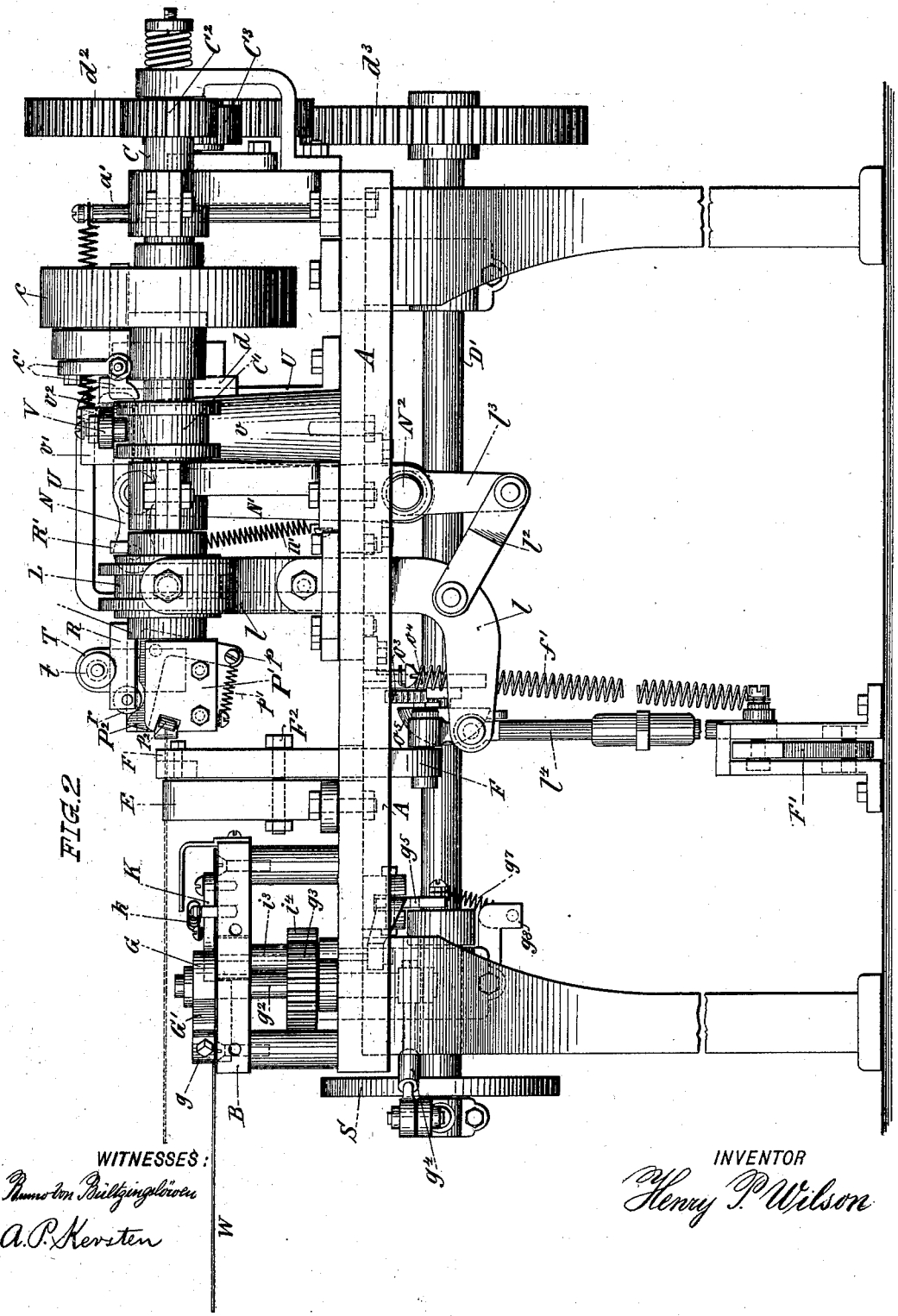

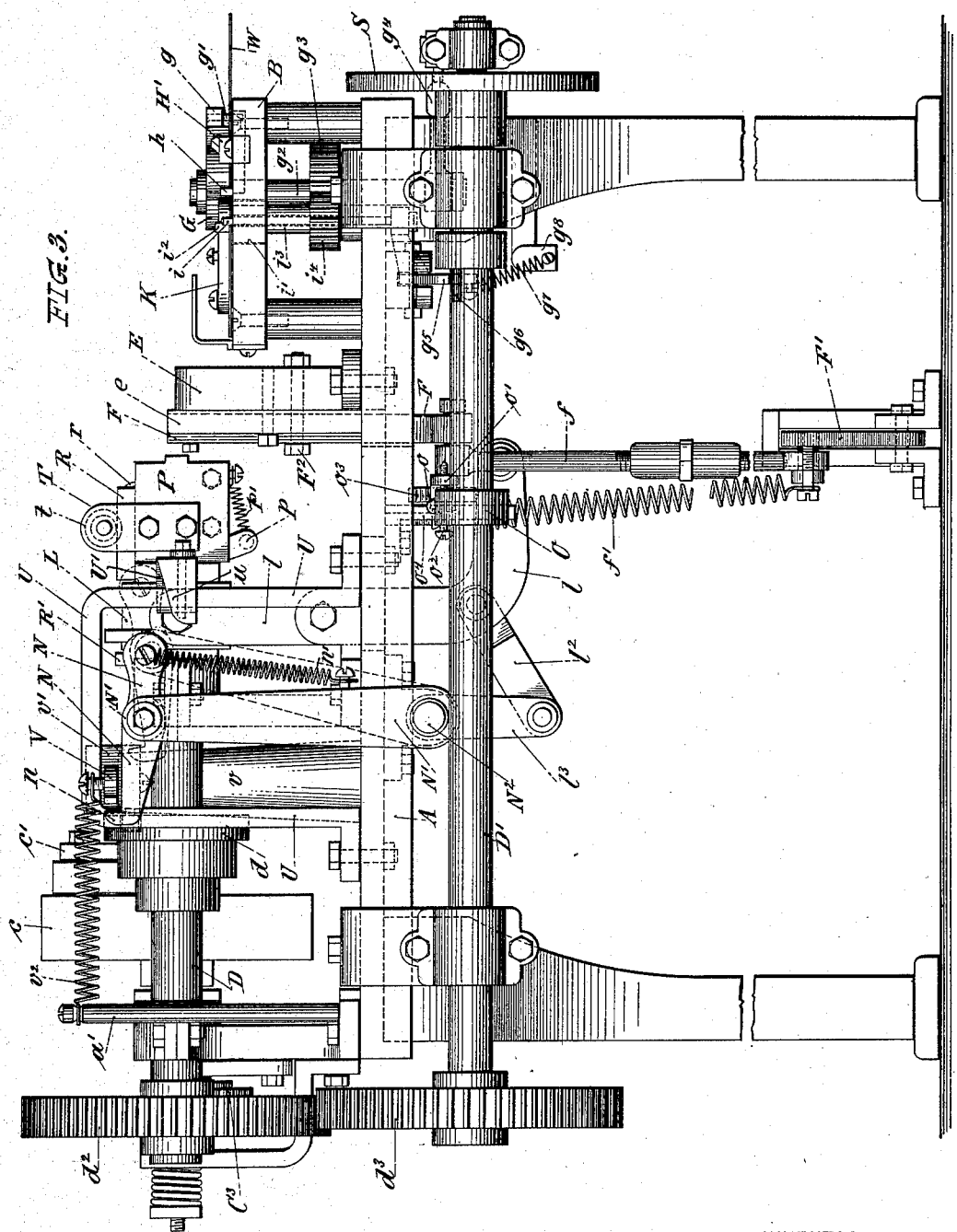

No. 749,348. PATENTED JAN. 12, 1904.
H. P. WILSON.
MACHINE FOR BENDING THE CROSS HEADS OF HAY BALE WIRES.
APPLICATION FILED DEC. 17, 1901.
NO MODEL. 6 SHEETS—SHEET 4.
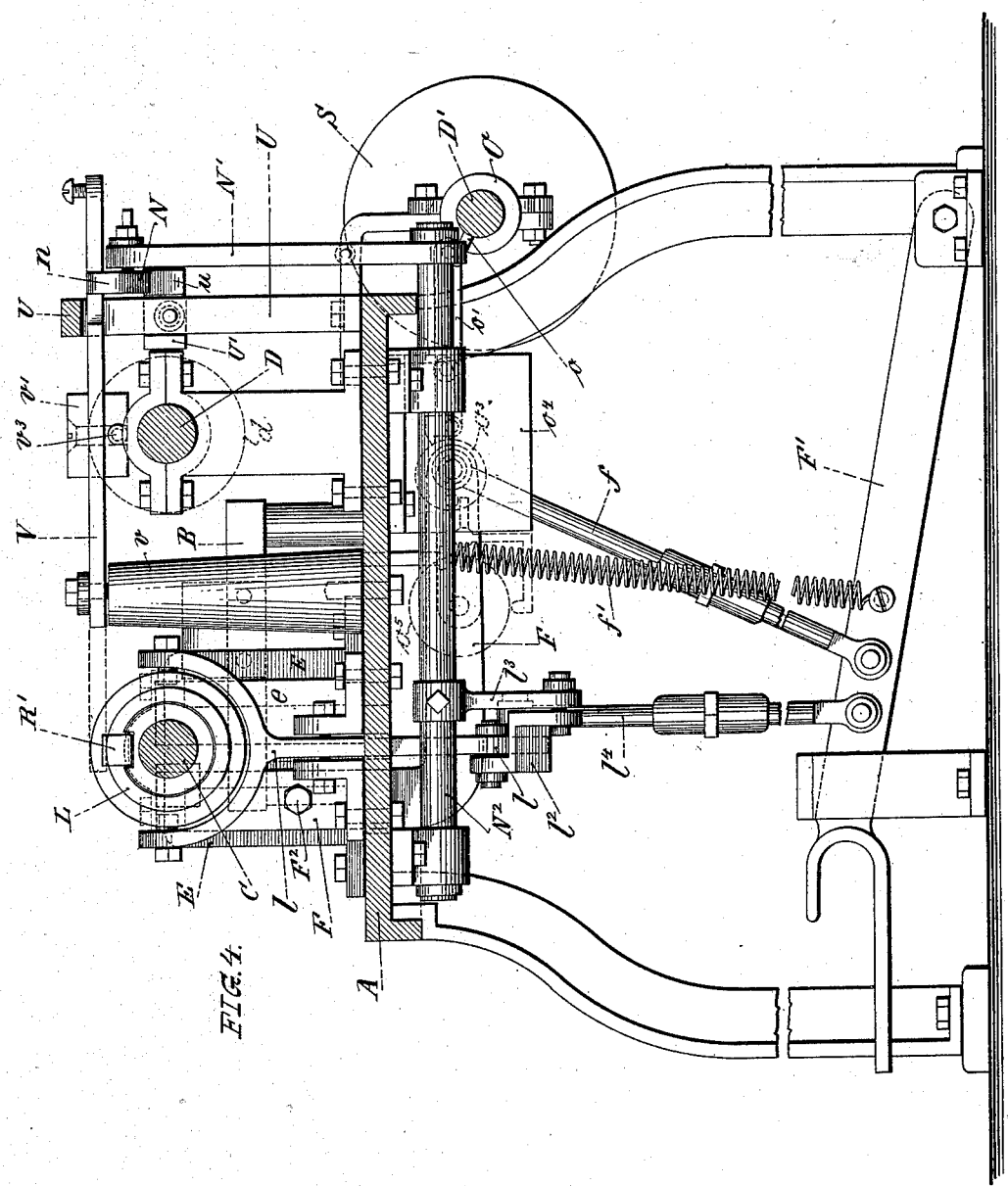
WITNESSES:
Bruno von Biltzingslöwen
A. P. Kersten
INVENTOR
Henry P. Wilson No. 749,348. PATENTED JAN. 12, 1904.
H. P. WILSON.
MACHINE FOR BENDING THE CROSS HEADS OF HAY BALE WIRES.
APPLICATION FILED DEC. 17, 1901.
NO MODEL. 6 SHEETS—SHEET 5.
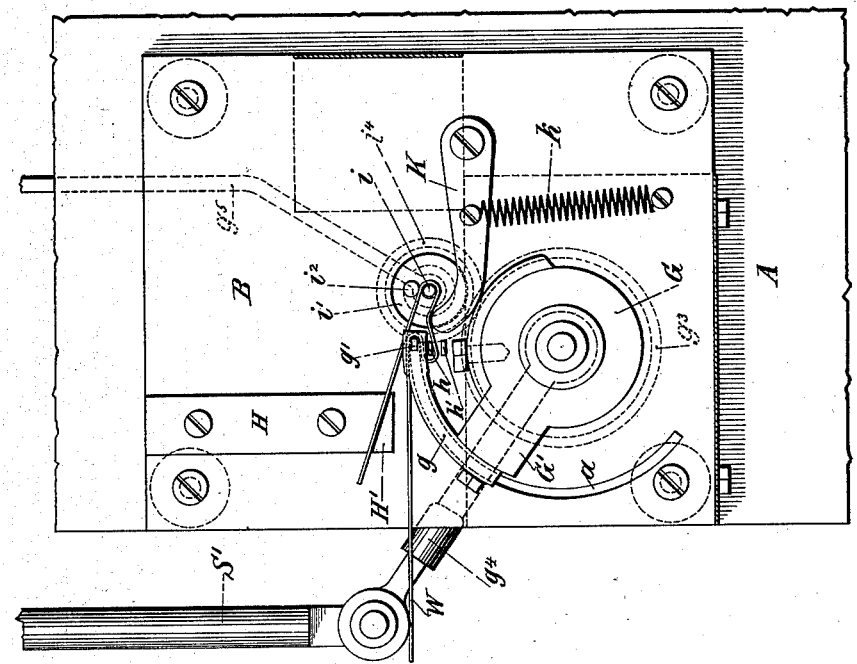
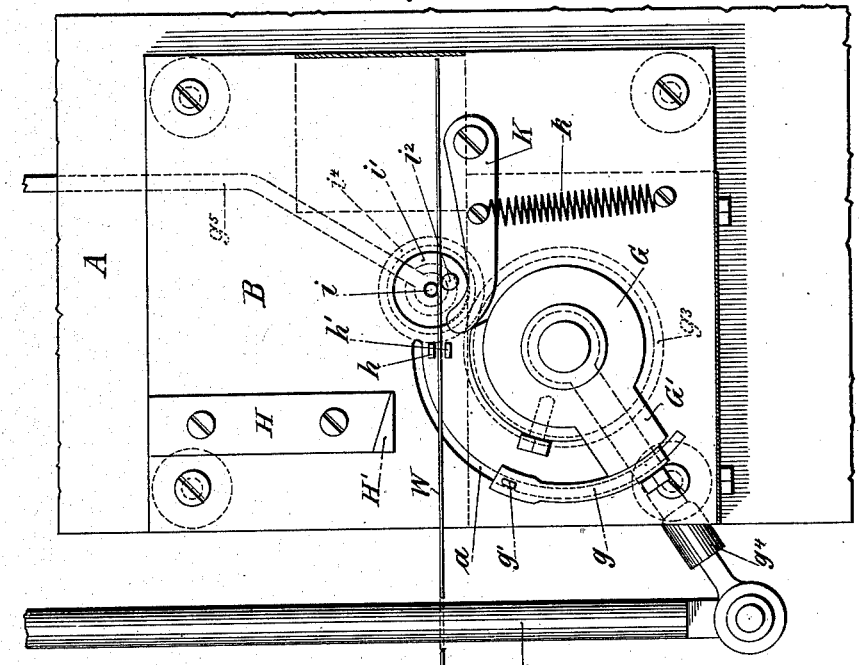
WITNESSES:
Bruno von Bültzingslöwen
A. P. Kersten
INVENTOR
Henry P. Wilson

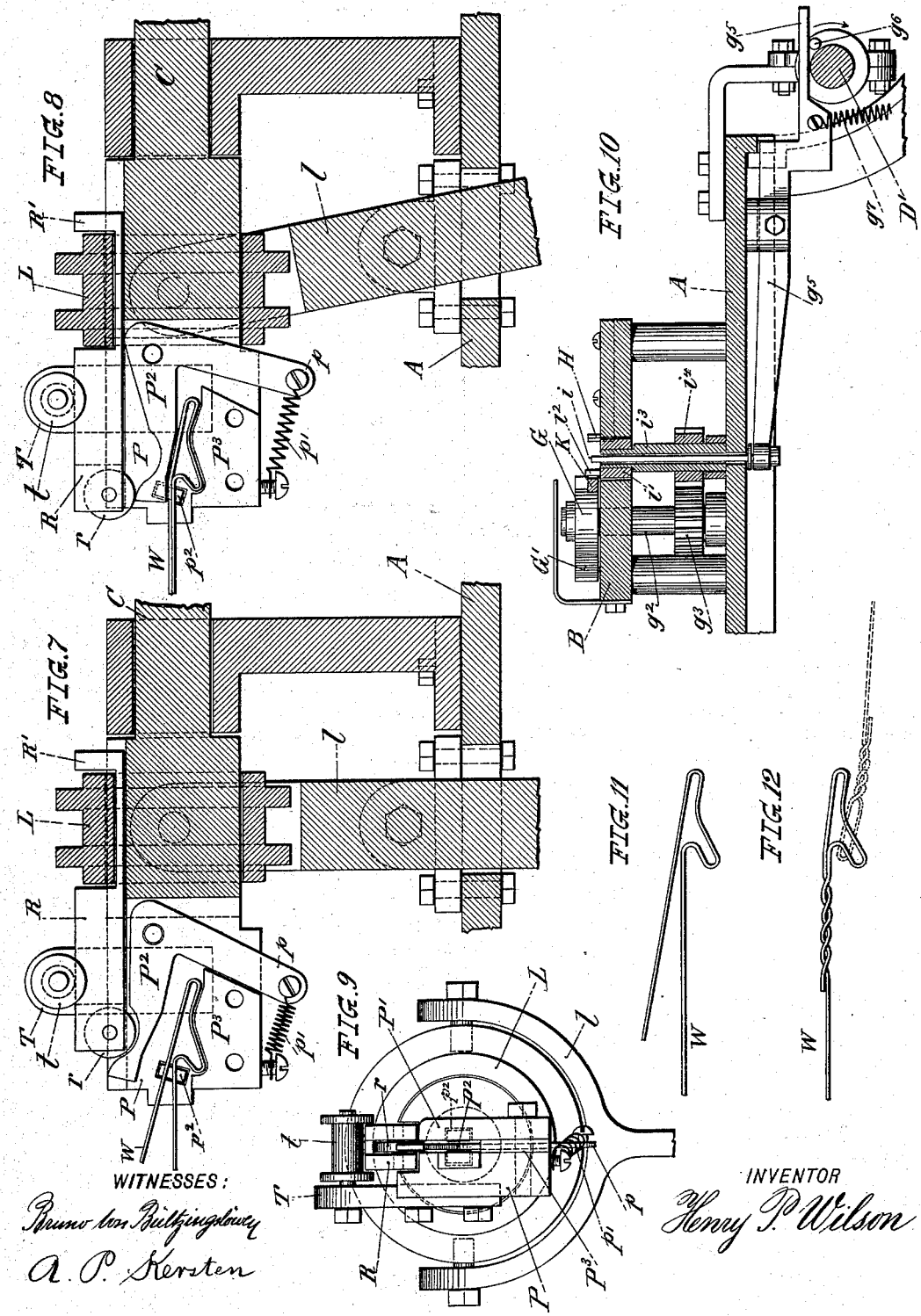

No. 749,348. Patented January 12, 1904.

UNITED STATES PATENT OFFICE.

HENRY P. WILSON, OF NEW YORK, N. Y.

MACHINE FOR BENDING THE CROSS-HEADS OF HAY-BALE WIRES.

SPECIFICATION forming part of Letters Patent No. 749,348, dated January 12, 1904.

Application filed December 17, 1901. Serial No. 86,286. (No model.)

*To all whom it may concern:*

Be it known that I, HENRY P. WILSON, a citizen of the United States, residing at New York, in the county and State of New York, have invented certain new and useful Improvements in Machines for Bending the Cross-Heads of Hay-Bale Wires, of which the following is a specification, reference being made to the accompanying drawings.

The present invention relates to improvements in machines for bending the cross-heads of hay-bale wires; and the object of it is to produce cross-heads adapted for binding hay-bales or the like in such manner that the hand labor for this work is reduced to such extent as to allow the manufacture to be performed by hands unskilled in this art, whereby also the production is accelerated, facilitated, and rendered cheaper than by any means heretofore in use.

The invention consists of a die mechanism operated by the revolution of a crank-disk, which produces one cross-head at each turn. This mechanism comprises means for leading and holding the wire-blank during the operation and also means for facilitating the taking out by hand of the finished cross-head.

Furthermore, the invention consists in a device for fastening the free end of the so-formed cross-head to the long end of the wire body in twisting the two parts together and in means for limiting the operation of all parts to such. extent as to produce only one cross-head at a time—that is to say, while one cross-head is formed in the die mechanism another one is finished by twisting its shanks.

In the accompanying drawings, Figure 1 is a plan view of my machine, showing all parts ready for operation, the wire-blank being inserted in proper position. Fig. 2 is a side elevation of my machine looking toward the front of Fig. 1. Fig. 3 is another side elevation looking toward the back of Fig. 1. Fig. 4 is a cross-section on the line 4 4 of Fig. 1. Figs. 5 and 6 are detail plan views of the die mechanism, showing the inserted wire-blank in its position before and after effecting the bending operation. Figs. 7 and 8 show detail side elevations, partly in section, of the device for twisting the shank of the cross-head produced by the die mechanism, the operating parts being in both figures in different position. Fig. 9 is a front view of the device shown in Fig. 8. Fig. 10 is a sectional view of the die mechanism in the same position as represented in Fig. 2, showing the gearing for forming the cross-head and means for facilitating the releasing of the finished work piece. Figs. 11 and 12 are representations of the cross-head in two different stages of its manufacture.

Similar letters of reference represent corresponding parts of my machine.

Referring to the drawings, A indicates the base-plate of the machine, carried by a suitable support, so as to bring the machinery in a proper position for use.

The die mechanism, as shown in detail in Figs. 5, 6, and 10, is arranged upon a separate bed-plate B, mounted on the main base-plate A. Two vertical shafts $g^2$ and $i^3$ are journaled in said plates and connected by pinions $g^3$ and $i^4$. A cam is rigidly secured to the hub G of a projecting arm G', carrying an oscillating hook-bending finger $g$, which is guided by means of a lug $g'$, sliding in a circular groove $a$ of the bed-plate B. A finger K is pivoted upon the latter, so as to be operated by said cam of the hub G and kept in its inoperative position by a spring $k$. Two pins $h$ and $h'$, which lead the wire, project upwardly from bed-plate B. Pin $h$ is arranged in front of the center of shaft $i^3$, serving as a lug during the hook-bending operation, while pin $h'$ serves as abutment during the operation of a bending-roller $i^2$, which is rigidly mounted on the upper end of shaft $i^3$, located sidewise of the center of the same upon a disk $i'$, which is inserted into a suitable recess of the bed-plate B. A center pin $i$ is guided in a central bore of the upright shaft $i^3$, projecting from the same on both ends, the lower one being connected to a lever $g^5$, which is kept in its upward position by a spring $g^7$, secured at $g^8$ on a projecting part of the base-plate A. A lug H', rising from a plate H, which is inserted into a recess of the bed-plate B, serves for the purpose of limiting the bending motion of the free end of the wire-blank W, as represented in Fig. 6.

The whole mechanism, as above described, is operated by a rotating crank-disk S, producing at each revolution an oscillating movement of a lever $g^4$ by means of a connecting-rod S', this lever $g^4$ being mounted upon the lower projecting part of the shaft $g^2$.

The device for twisting the ends of the hook produced by the die mechanism is more clearly illustrated in the detail views of Figs. 7, 8, and 9 and consists of the following parts: The forward enlarged extension P of the driving-shaft C, which is journaled in two bearings mounted upon the base-plate A, has a square flattened form. On one side of the same a plate $P^3$ is secured, the upper edge of which is cut to correspond with one part of the cross-head and serves as a stationary clamping-jaw. In order to facilitate placing of such cross-head in this recess, small guiding-rolls $p^2$ are provided. $P^2$ represents an angle-lever fulcrumed at the square head P and serving as movable clamping-jaw, so as to tightly press the free shank of the cross-head against the long end of the wire-blank, as shown in Fig. 8. A spring $p'$, fastened to the square head P and to the downwardly-projecting part $p$ of the angle-lever $P^2$, serves for drawing this movable clamping-jaw back to its inoperative position. Upon the main shaft C a sliding ring L is mounted, covering one part of a sleeve R, which is inserted into a longitudinal recess of said shaft. By a projection R' of this sleeve R the latter is connected with the ring L in such manner as to be operated by the sliding movement of the same. In this movement the forwardly-extending arm of sleeve R is guided by a roll $t$, pivoted to an arm T, which is screwed to the square head P of the driving-shaft C. This forwardly-extending arm of the sleeve R is slotted and carries a roller $r$, operating the movable clamping-jaw $P^2$. A plate P' covers the so-formed recess for the cross-head. In order to tightly keep the shanks of the latter together and to allow the twisting operation, a vise is provided, which acts immediately when the machine is operated. E indicates a support for this vise, which is fastened upon the base-plate A. A stationary part $e$ projects laterally from this support, while an oscillating lever F is fulcrumed at $F^2$ on the same, so as to form a clamp with the rigid part $e$.

The means for driving and operating the whole machinery are represented in the drawings by Figs. 1 to 4 and consist of the following parts: A power-pulley $c$, driven by any kind of a suitable power, is loosely mounted upon the driving-shaft C, but may be coupled through the medium of a common clutch $c'$. The latter is operated by a treadle F', which at the same time effects the shifting of the aforesaid sliding ring L by means of an adjustable connecting-rod $l^4$ and lever $l$, the upper part of which is formed as a fork surrounding the sliding ring L and loosely holding the same by two pins. Furthermore, this foot-lever F', which is kept in its upward position by a spring $f'$, operates the vise $e$ F by another adjustable connecting-rod $f$. The clutch $c'$ is operated by the following combination: A connecting-piece $l^2$ leads from the lever $l$ to another lever $l^3$, which is rigidly mounted upon an axle $N^2$, journaled in bearings downwardly projecting from the base-plate A. On one side of this axle $N^2$ an arm N' is secured, carrying a swinging lever N, one end of which is connected with the arm N' by a spring $n'$, while the other end is formed to a hook $n$, which engages a horizontal lever V, pivoted at $v$ upon the base-plate A. This horizontal lever V is held against the hook $n$ of the swinging lever N by means of a spring $v^2$, fixed with its other end to a pin $a'$, upwardly projecting from the base-plate A, as shown in Figs. 1, 2, and 3. In order to raise the spring-connected end of the swinging lever N for releasing the lever V when sufficiently drawn back, as indicated in dotted lines in Figs. 1, 3, and 4, a block U', with a cam-surface $u$, is provided on a frame U, the latter being screwed upon the base-plate A. The other end of this lever V engages a slide-ring C' by means of a pin loosely inserted into a groove formed by the flanged side portions of said ring, which operates the clutch $c'$ of the power-pulley $c$.

The gearing from the main shaft C to the die mechanism is produced by the following means: A pinion $C^2$ is mounted upon shaft C and connected with a gear-wheel $d^2$ in the ratio of three to one by an intermediate pinion $C^3$. The gear-wheel $d^2$ meshes with another one, $d^3$, which is fixed upon the shaft D' of the crank-disk S, operating the die mechanism. On the shaft D of gear $d^2$ a disk $d$ is rigidly mounted, having a recess for a pin $v^3$, laterally projecting from the oscillating lever V, thus preventing the shifted lever V to slide back into its normal position and thereby to disengage the clutch coupling device before one revolution of shaft D is completed. This limits the motion of the crank-disk S to one revolution and the motion of shaft C to three revolutions, according to the ratio of the gearing $C^2$ and $d^2$. Upon shaft D' of the crank-disk S a pin $g^6$ is mounted in such manner as to engage the lever $g^5$ in pressing the same upwardly after the operation of the die mechanism is performed, thereby disengaging the pin $i$ and facilitating the taking out of the formed cross-head.

A controlling device may be also operated by shaft D', as illustrated in Figs. 1 to 4. A ring O, fixed upon said shaft D', is provided with a pin $o$, engaging in each revolution a screw $o^2$, which is fastened to one end of a lever $o'$. The latter is pivoted to an angle-flange $o^4$, downwardly projecting from the base-plate A. The other end of this lever $o'$ carries a screw which operates a pinion $o^3$, pivoted to the angle-flange $o^4$ in such manner as to intermittently rotate the same by shifting it one tooth at each revolution of the shaft D'. The pinion $o^3$ actuates in each revolution a hammer, striking a bell $o^5$, thus marking the manufacture of a certain number of hooks.

The operation of the machine is as follows: After the wire-blank is inserted into the die mechanism, as shown in full lines in Figs. 1 and 5, the treadle F' is depressed. Thereby the axle $N^2$, with the arm N', is operated through the medium of the connecting-rod $l^4$ and levers $l\ l^2\ l^3$ in such manner as to throw the clutch $c'$ into engagement in turning the horizontal lever V. By means of the gearing $C^2\ C^3\ d^2\ d^3$ the rotation of the driving-shaft C is communicated to shaft D' of the crank-disk S, whereby the connecting-rod S' produces an oscillating movement of the lever $g^4$. In this movement the lug $g'$, sliding in the groove $a$, forces the wire-blank W round the lug $h$, while the pivoted finger K produces a slight bending of the wire, being operated by the cam on the hub G, as represented in Fig. 6. At the same time the disk $i'$, with the bending-roller $i^2$, is operated by means of the pinions $g^3$ and $i^4$, so as to bend the wire-blank round the center pin $i$ until lying against the lug H'. When this operation is performed, the upper projecting part of the center pin $i$ is disengaged from its tight connection with the wire by the rocking movement of lever $g^5$, produced by the pin $g^6$ upon the shaft D'. At the same time the pin $v^3$ of the horizontal lever V keeping the clutch in its operative position returns into the recess of the disk $d$, thereby disengaging said coupling and automatically stopping the operation of all parts. The so-formed cross-head is now inserted into the mechanism for twisting its shanks, as shown in dotted lines in Fig. 1 and in the detail view of Fig. 7. At the same time another wire-blank is placed into the die mechanism. When the treadle F' is again depressed, the clutch operates in the same way as above described. The shanks of the cross-head, which is inserted between the square head P of the driving-shaft C and plate P', are seized by the vise $e$ F after the free end of the cross-head is tightly pressed against the long end of the wire-blank by means of the movable clamping-jaw $p^2$, depressed by the forward movement of the sleeve R. According to the ratio of the gearing $C^2\ C^3\ d^2$ the driving-shaft C produces three revolutions during the time of its operation, thereby twisting the shanks of the cross-head three times, while the die mechanism produces another cross-head by one revolution of the crank-disk S. The automatical disengagement of the clutch $c'$ stops again the operation of all parts.

Having thus described my invention, the following is what I claim as new and desire to secure by Letters Patent:

1. In a machine for bending the cross-heads of hay-bale wires, the combination of an upright shaft, a center pin in said shaft, a bending-roller on said shaft located sidewise of the center pin, an oscillating finger adjacent to the bending-roller, an oscillating hook-bending finger, and stationary bending devices adjacent to said fingers and coöperating therewith for bending the end of the wire-blank into the shape of a cross-head, substantially as set forth.

2. In a machine for bending the cross-heads of hay-bale wires, the combination of an upright guide-shaft, a center pin in said shaft, a bending-roller on said shaft sidewise of the pin, a pivoted finger sidewise of said roller, an oscillating hook-bending finger the hub of which is provided with a cam for actuating the pivoted bending-finger, a stationary lug in line with the center pin, and an abutment alongside the stationary lug, said lug and abutment permitting the entrance of the oscillating hook-bending finger, substantially as set forth.

3. In a machine for bending the cross-heads of hay-bale wires, the combination of a center pin, an upright shaft having a central bore for the same, a bending-roller on said shaft located sidewise of the center pin, a pivoted finger extending in front of the bending-roller, a hook-bending finger, means on the hub of the hook-bending finger for actuating the pivoted finger as soon as the bending-roller is rotated around the center pin, a fixed lug in front of the center pin, an abutment near the same, said lug and abutment permitting the entrance of the hook-bending finger for forming the hook, means for imparting rotary reciprocating motion to the hook-bending finger and bending-roller, and means for withdrawing the center pin as soon as the cross-head is formed so as to permit the removal of the bale-wire from the bending devices, substantially as set forth.

4. In a machine for bending the cross-heads of hay-bale wires, the combination of an upright shaft, a vertically-guided center pin in said shaft, a bending-roller on said shaft sidewise of said center pin, a pivoted finger sidewise of said bending-roller, an oscillating hook-bending finger the hub of which is provided with a cam for actuating the pivoted bending-finger, stationary bending devices coöperating with said fingers for bending the end of the wire-blank into the shape of a cross-head, means for imparting motion to the hook-bending finger and the bending-roller, and means for withdrawing the center pin below the top of the upright shaft for permitting the removal of the cross-head, substantially as set forth.

5. In a machine for bending the cross-heads of hay-bale wires, the combination of a vise for the shank of the cross-head, a shaft, a stationary clamping-jaw on said shaft, a movable clamping-jaw on said shaft coöperating with said stationary jaw to engage the cross-head, a sleeve on said shaft adapted to close said jaws, a power-pulley, a clutch between the same and the shaft, an operating-treadle, means connecting said sleeve with said treadle, and means connecting said clutch with said treadle, substantially as set forth.

6. In a machine for bending the cross-heads of hay-bale wires, the combination, with the bending devices, of shank-twisting devices, a power-pulley, motion-transmitting mechanism between said power-pulley and the bending devices, motion-transmitting mechanism between said power-pulley and the twisting devices, a treadle, means connecting the same with the twisting devices, a clutch between said motion-transmitting mechanisms and the power-pulley, and means connecting said treadle with said clutch, substantially as set forth.

7. In a machine for bending the cross-heads of hay-bale wires, the combination of a pair of cross-head-holding jaws formed of a fixed jaw and an oscillating jaw, a pair of cross-head-clamping jaws, one being fixed and the other movable, a reciprocating sleeve provided with a forwardly-extending arm having a roller for closing the clamping-jaws on the cross-head, a driving-shaft provided with an enlarged and recessed extension for the clamping-jaws and sleeve, and means for rotating the driving-shaft with the clamping-jaws for twisting the shanks of the cross-head, substantially as set forth.

8. In a machine for bending the cross-heads of hay-bale wires, the combination, with the bending devices, of a driving-shaft, motion-transmitting mechanism between the driving-shaft and said bending devices for actuating the latter, devices for twisting the shanks of the cross-heads, mechanism between the driving-shaft and said shank-twisting devices for transmitting motion thereto, a treadle, mechanism operated by the treadle for clutching the power-pulley to the driving-shaft, and a stop-motion mechanism interposed between the clutch on the driving-shaft and the treadle-actuated mechanism for interrupting the motion of the driving-shaft independently of the release of the treadle, substantially as set forth.

9. In a machine for bending the cross-heads of hay-bale wires, the combination, with movable bending devices, of upright shafts for actuating said movable bending devices, a driving-shaft, motion-transmitting mechanism between said driving-shaft and the shafts of the movable bending devices, and stationary bending devices adjacent to said movable bending devices and coöperating therewith for bending the end of the wire-blank into the shape of a cross-head, substantially as set forth.

10. In a machine for bending the cross-heads of hay-bale wires, the combination, with the bending devices, of a driving-shaft, a power-pulley, motion-transmitting mechanism between said driving-shaft and bending devices, a vise for the shank of the cross-head, jaws carried by said driving-shaft and adapted to engage a cross-head, a sleeve on said shaft adapted to close said jaws, a clutch between said power-pulley and shaft, and means for simultaneously operating said sleeve and clutch, substantially as set forth.

Signed at New York, in the county of New York and State of New York, this 19th day of November, A. D. 1901.

HENRY P. WILSON.

Witnesses:
RICHARD S. TREACY,
WILLIAM H. SCHILLING.